US009509520B2

(12) United States Patent
Wijnands

(10) Patent No.: US 9,509,520 B2
(45) Date of Patent: Nov. 29, 2016

(54) DETECTION OF REPAIR NODES IN NETWORKS

(71) Applicant: Cisco Technology, Inc., San Jose, CA (US)

(72) Inventor: Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 14/298,342

(22) Filed: Jun. 6, 2014

(65) Prior Publication Data

US 2014/0362731 A1    Dec. 11, 2014

Related U.S. Application Data

(60) Provisional application No. 61/832,415, filed on Jun. 7, 2013, provisional application No. 61/833,237, filed on Jun. 10, 2013.

(51) Int. Cl.
| | |
|---|---|
| *H04L 12/18* | (2006.01) |
| *H04L 12/707* | (2013.01) |
| *H04L 12/703* | (2013.01) |
| *H04L 12/723* | (2013.01) |
| *H04L 12/24* | (2006.01) |

(52) U.S. Cl.
CPC ............... *H04L 12/18* (2013.01); *H04L 45/22* (2013.01); *H04L 45/28* (2013.01); *H04L 45/50* (2013.01); *H04L 41/0659* (2013.01)

(58) Field of Classification Search
None
See application file for complete search history.

(56) References Cited

U.S. PATENT DOCUMENTS

| | | | | |
|---|---|---|---|---|
| 7,826,345 | B2 * | 11/2010 | Kam | H04J 3/14 370/216 |
| 8,107,363 | B1 | 1/2012 | Saluja | 370/22 |
| 8,332,693 | B2 | 12/2012 | Cao et al. | 714/43 |
| 2002/0075873 | A1 | 6/2002 | Lindhorst-Ko et al. | 370/394 |
| 2007/0036072 | A1 * | 2/2007 | Raj | H04L 45/00 370/225 |
| 2007/0174483 | A1 | 7/2007 | Raj | 709/238 |
| 2009/0154346 | A1 | 6/2009 | Sun | 370/228 |
| 2012/0033542 | A1 | 2/2012 | Hanif | 370/217 |
| 2013/0322233 | A1 * | 12/2013 | Csaszar | H04L 45/22 370/218 |

\* cited by examiner

*Primary Examiner* — Bunjob Jaroenchonwanit
(74) *Attorney, Agent, or Firm* — Campbell Stephenson LLP

(57) ABSTRACT

An apparatus and method for detection of repair nodes in a network. In one embodiment of the method, a first node generates a first message and a second message, wherein each of the first and second messages includes a first node identification (ID) that uniquely identifies the first node within a network. The first message includes a first path ID, wherein the first path ID corresponds to a first path through which the first node receives data packets of a stream. The second message includes a second path ID, wherein the second path ID corresponds to a second path through which the first node receives copies of the data packets. The first and second path IDs are distinct from each other. The first node transmits the first message upstream towards a root node for the stream via a first interface of the first node, and the first node transmits the second message upstream towards the root node via a second interface of the first node. The first and second interfaces are distinct from each other.

20 Claims, 7 Drawing Sheets

DETECTION OF REPAIR NODES IN NETWORKS

RELATED APPLICATIONS

This application claims the domestic benefit under Title 35 of the United States Code §119(e) of U.S. Provisional Patent Application Ser. No. 61/832,415, filed Jun. 7, 2013, entitled "mLDP MoFRR Detection of Repair Nodes," and naming Ijsbrand Wijnands as the inventor; and U.S. Provisional Patent Application Ser. No. 61/833,237, filed Jun. 10, 2013, entitled "mLDP MoFRR Detection of Repair Nodes," and naming Ijsbrand Wijnands as the inventor; which are hereby incorporated by reference in their entirety and for all purposes as if completely and fully set forth herein.

BACKGROUND

Multicast enables simultaneous transmission of data packets between a source (e.g., a server) and receivers that have joined a group identified by a multicast group IP address. A data packet is a formatted unit of data that typically contains control information and payload data. Control information may include: IP addresses (e.g., source and group IP addresses), error detection codes like checksums, sequencing information, etc. Control information is typically found in packet headers and trailers, with payload data in between.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
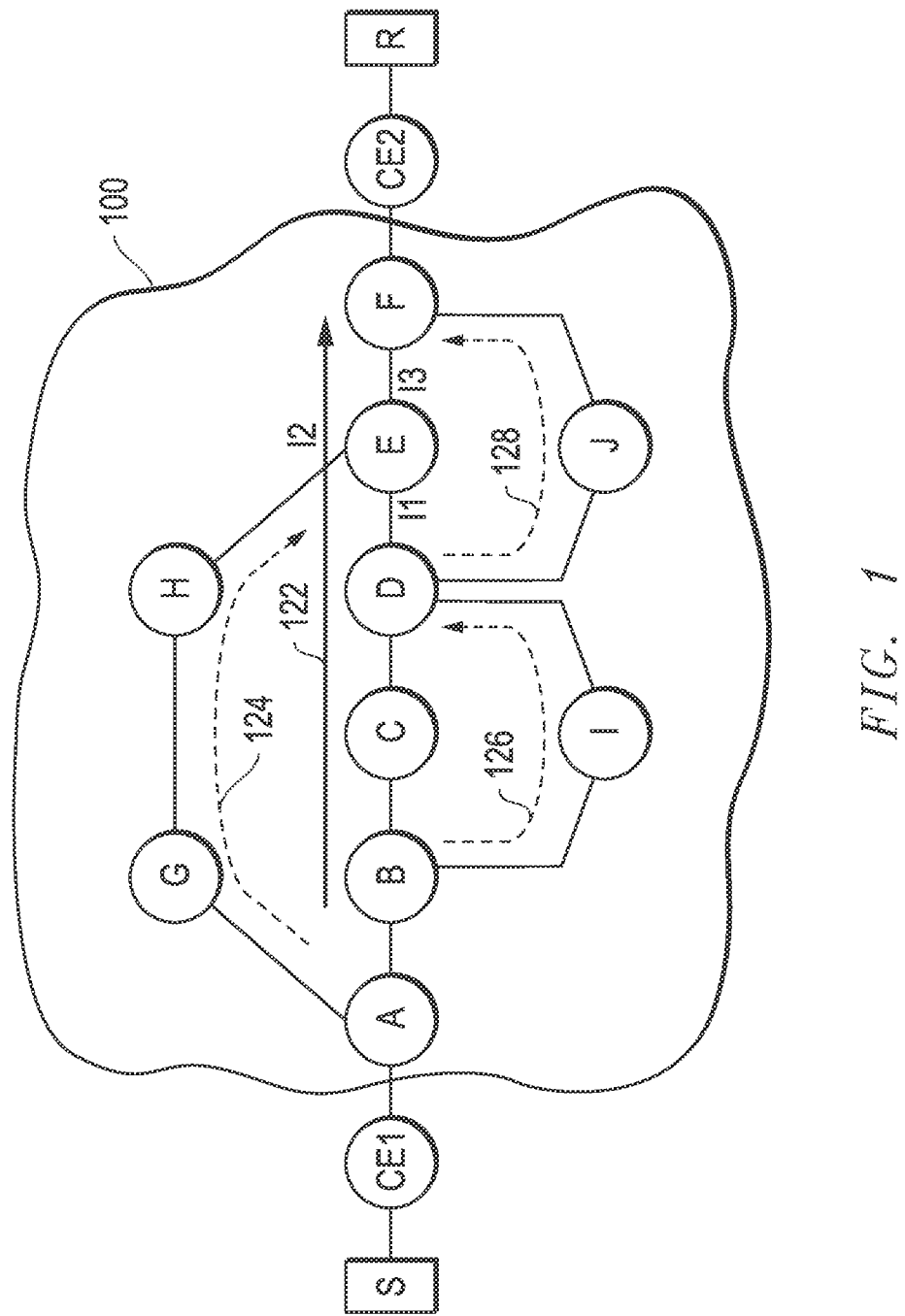
FIG. 1 is a block diagram illustrating certain components of an example network.

An apparatus and method for detection of repair nodes in a network. In one embodiment of the method, a first node generates a first message and a second message, wherein each of the first and second messages includes a first node identification (ID) that uniquely identifies the first node within a network. The first message includes a first path ID, wherein the first path ID corresponds to a first path through which the first node receives data packets of a stream. The second message includes a second path ID, wherein the second path ID corresponds to a second path through which the first node receives copies of the data packets. The first and second path IDs are distinct from each other. The first node transmits the first message upstream towards a root node for the stream via a first interface of the first node, and the first node transmits the second message upstream towards the root node via a second interface of the first node. The first and second interfaces are distinct from each other.

Third Party Provider Networks

A stream of multicast data packets can flow to receivers through a multicast distribution tree that includes of number of nodes. Nodes may take form in one or more routers, one or more bridges, one or more switches, one or more servers, or any other suitable communications processing device.

Packet-switched nodes in a distribution tree forward multicast data packets based on control information (e.g., the source and/or group IP addresses) contained in packet headers. Some nodes are responsible for replicating multicast data packets at bifurcation points (i.e., branch points of the tree). This enables only one copy of a multicast data packet to travel over any particular link, making multicast distribution trees extremely efficient for distributing the same information to many receivers.

Businesses and other entities often employ private packet-switched networks to transmit multicast packets between sources and receivers. As a business grows, so can its network, increasing the number of network elements and geographic diversity. The network elements can be scattered throughout a city, a state, a country, or the world. Since it can be prohibitively expensive to create a private network that spans great distances, many businesses opt to rely upon a third-party provider's network to provide connectivity between elements such as sources and receivers at disparate geographic sites. In order for the business' network to seamlessly function through the provider's network, the provider's network must be able to provide a medium for transmission of various types of data packets.

Multiprotocol Label Switching

Multiprotocol Label Switching (MPLS) is a scalable, protocol-independent transport mechanism. MPLS is commonly employed in third-party provider networks. Nodes employing MPLS make packet forwarding decisions based on labels attached to packets as opposed to making forwarding decisions based on IP addresses contained in packet headers. As a result, packet-forwarding decisions in MPLS network can be made more efficiently since there is no need to examine IP addresses.

MPLS networks carry packets via label switched paths (LSPs). A unicast stream of data packets can enter an MPLS network via an ingress edge node, travel hop-by-hop along several core nodes, and exit via an egress node. A multicast stream may enter at an ingress node, travel hop-by-hop, and exit via several egress nodes. The ingress node will be referred to as the provider root for the unicast or multicast stream.

Point-to-point (P2P) LSPs enable unicast transmission of data packets across an MPLS network. P2P LSPs also enable unicast transmission of control packets (e.g., fast notification packets (FNPs) more fully described below) between nodes of the MPLS network as will be more fully described below. Point-to-multipoint (P2MP) LSPs enable transmission of multicast data packets across an MPLS network. Bifurcation points (i.e., branch nodes) in P2MP LSPs replicate multicast data packets as needed. The creation of P2P and P2MP LSPs within an MPLS network is well known by those of ordinary skill in the art. U.S. Pat. No. 7,852,841 describes an example in-band multicast label distribution protocol (mLDP) technique that can be used to establish a P2MP LSP through an MPLS network, and is hereby incorporated herein by reference.

Packets are forwarded along an LSP based on labels and forwarding tables. Labels allow for the use of very fast and simple forwarding engines in the data planes of nodes. A label is a short, fixed-length, locally significant identifier that can be associated with a forwarding equivalence class (FEC). Each multicast or unicast stream can be associated with a respective FEC. Accordingly, each unicast or multicast stream can be associated with a respective FEC. Packets received at an ingress node and associated with the same FEC should follow the same LSP through the network.

LDP is typically employed in the control planes of MPLS nodes. Two nodes, called LDP peers, can bi-directionally exchange labels on FEC by FEC basis during LSP creation. Nodes build and maintain forwarding tables that map labels to next hop interfaces. These forwarding tables can be used to forward packets as more fully described below.

When a data packet is received by an ingress node of an MPLS network, the node may use control information in the packet to determine a FEC for the packet. Characteristics for determining the FEC can vary, but typically the determination is based on the packet's IP addresses. Quality of Service or other information may also be used to determine the FEC. Once determined, the ingress node can access a table that maps the FEC to a label or labels. The table may also map a next hop egress interface or multiple next hop egress interfaces to the respective label or labels. The ingress node attaches a label to the packet and forwards the combination to a neighbor node via the next hop egress interface mapped to the label.

When a node receives a packet with an attached label (i.e., the incoming label), the node can access its forwarding table and read a next hop egress interface and another label (i.e., an outgoing label), both of which are mapped to the incoming label. P2MP LSPs can bifurcate at branch nodes. For these nodes, the incoming label may be mapped to two or more outgoing labels and respective next hop egress interfaces. The incoming label may also be mapped to a forwarding preference bit in the forwarding table. If this bit is not set, the node may drop the packet as will be more fully described below.

Before the packet is forwarded to the next hop via the mapped egress interface, the node swaps the incoming label with a mapped outgoing label. The next hop receives the packet with label and may perform the same process. This process is often called hop-by-hop forwarding. The penultimate node in the LSP may pop the incoming label before forwarding the packet. In another embodiment, the last hop node of the LSP may pop the incoming label before processing or forwarding the packet. Hop-by-hop forwarding can also be used to send control packets (e.g., FNPs) along a P2P LSP between nodes.

Stream Restoration Mechanisms

Nodes or communication links within an MPLS network can fail at the worst of times. When this happens, the flow of a stream of packets to a receiver or multiple receivers may be interrupted. Flow can be restored using mechanisms disclosed herein. The present disclosure will be described with reference to restoration of a single stream after failure of a link or node. However, the present disclosure should not be limited thereto. The failure of a link may disrupt several stream flows. Multiple streams can be restored after failure of a link or node using the techniques described herein. Moreover, while the present disclosure will reference restoration of a multicast stream, the disclosure can be used to restore a unicast stream. The remaining disclosure will described with restoration of an example stream identified by FEC1.

Primary LSPs, including P2P and P2MP LSPs, transmit steams of data packets to receivers. Restoration mechanisms described herein may use secondary LSPs to restore the flow of streams to receivers after failure of a link or node along primary LSPs. In typical restoration mechanisms, data packets of a stream and redundant copies thereof are concurrently sent downstream towards egress nodes on primary and corresponding secondary LSPs (hereinafter primary and secondary paths), respectively. The primary and secondary paths can merge at nodes called repair nodes. Thus, repair nodes may concurrently receive packets from an upstream, next-hop node on the primary path and redundant copies from an upstream, next-hop node on the secondary path. Normally, the repair node accepts and forwards the packets from the primary path, and discards the redundant copies. Forwarding tables in repair nodes may include forwarding preference bits that indicate whether packets from a primary path or a secondary should be discarded. When a failure occurs at an upstream link or node that disrupts the flow of packets on the primary path, the repair node can switch to forwarding the redundant packets received on the secondary path by first updating the appropriate forwarding preference bit. Thereafter the node accepts and forwards the redundant packets, which restores flow to receivers. The restoration is fast, which greatly improves convergence times in the event of node or link failure.

Nodes on primary path for a stream can detect a local failure (e.g., the failure of an upstream neighbor node and/or the link therebetween) that disrupts the flow of the stream. When a node detects the local failure, the node can determine the identity of the interrupted stream and start the restoration mechanism described above. More particularly, the node can generate and send a fast notification packet (FNP) downstream along the primary path. The FNP may include the FEC that identifies the interrupted stream, or a label attached to the FNP may be used to identify the interrupted stream. A downstream repair node that directly or indirectly receives the FNP can restore the flow of the stream by switching to the secondary path as described above. U.S. patent application Ser. No. 13/562,525, entitled mLDP Failover Using Fast Notification Packets, describes example embodiments of this restoration process, and is incorporated herein by reference in its entirety.

While the foregoing restoration mechanism is effective at restoring the flow of a stream to receivers, it may adversely affect overall performance of an MPLS network. The node that detects a local failure, blindly generates and transmits the FNP downstream. In other words, the node does not know the identity of the repair node that should receive the FNP and restore the flow of the disrupted stream. Repair nodes on the primary path must inspect the packets they receive in order to determine whether they are FNPs or data packets. When a repair node detects an FNP and determines it is the proper repair node to restore the flow of the stream in question, the repair node switches to the appropriate secondary path. Unfortunately, the inspection of packets, including data packets, to identify FNPs is process intensive, and can slow the overall operation of a repair node, which in turn may adversely affect the performance of MPLS networks.

If the node detecting the local failure also knows in advance the identity of the repair node that can restore flow of the interrupted stream, the node can send an FNP directly to that repair node via unicast. The repair node and any other repair node through which the FNP must travel to reach the repair node, need not inspect packets to determine whether they are FNPs. The remaining disclosure describes an alternative restoration mechanism that operates in accordance with this idea.

FIG. 1 illustrates an example network 100 that includes several nodes coupled together via communication links. The example network 100 may include additional nodes and links not shown. Each of the nodes can be identified by a unique node ID. In the embodiment shown, the nodes are uniquely identified by loopback addresses (hereinafter loopbacks) A-J. Each of the nodes A-J implements MPLS and LDP, or a modification thereof, in their control planes.

Network 100 provides connectivity between remotely located customer elements including source S and receiver R. Source S may take form in a server that generates an example stream, identified by FEC1, of data packets destined for a receiver or receivers, including receiver R. A primary path through network 100 transmits the example stream to receiver R. More particularly, primary path 122 is established through nodes A-F for transmitting the example stream from source S to receiver R. Secondary paths 124-128 can be used to restore the flow of the example stream to receiver R upon failure of a link or node in primary path 122. In this example, nodes D-F are repair nodes connected to secondary paths 124-128, respectively, that can restore the flow of the example stream to receiver R. It is noted that nodes can identify themselves as repair nodes by virtue of the fact that they receive packets associated with the same FEC via primary and secondary paths.

Using techniques described below, nodes on a primary path can learn the identity (e.g., the loopbacks) of repair nodes that can restore the flow of a disrupted stream. In one embodiment, the nodes can learn the identity of the repair nodes for respective streams through an exchange of mapping messages more fully described below. When a node on primary path 122 detects a local failure that interrupts a stream, the node can generate and send an FNP to a repair node it knows can restore the flow of the stream. This FNP can be sent via unicast to the repair node. Because the FNP is sent via unicast transmission, the repair node and intervening repair nodes need not inspect packets. To illustrate, node B may detect a failure of the link to node A, which obviously disrupts the flow of the example stream to receiver R. Node B knows, a priori, that node E is the topologically nearest repair node on the primary path that can restore the flow to receiver R. Accordingly, node B generates and sends an FNP to repair node E via unicast transmission over a P2P LSP. The FNP identifies the example stream by its FEC (e.g., FEC1), and instructs node E to restore it. In response to receiving the FNP, repair node E can access its forwarding table, adjust the forwarding preference bits for FEC1, and begin forwarding redundant packets received on secondary path 124.

Mapping Messages

Nodes can announce themselves as repair nodes for specific streams in primary and secondary mapping messages they send. Nodes can learn the identity of repair nodes for streams from information contained in the mapping messages they receive. Moreover, the information can be used to determine which of several candidate repair nodes should be selected to restore an interrupted stream. As will be more fully described, the information may include the identity (e.g., FEC) of a stream, and one or more repair node loopbacks mapped to respective path identifiers. In one embodiment, the path identifiers may be anything that distinguishes between a primary path and its corresponding secondary path at a repair node. For example, simple identifiers "P" and "S" with P mapped to a repair node's loopback, and S mapped to the repair node's loopback, may be used by the repair node to distinguish the primary and secondary paths, respectively, to which the repair node is connected. For purposes of explanation only, the remaining disclosure will use labels generated by the repair nodes as identifiers for the primary and secondary paths.

A repair node for a stream may generate and send an initial label mapping message or modify and send a received label mapping message. In one embodiment, a repair node can modify label mapping messages they receive by adding the node's loopback mapped to a label generated by the node. The initial or modified label mapping message is forwarded upstream on a primary path or a secondary path for the stream. Primary label mapping messages are sent upstream on primary paths, while secondary label mapping messages are sent upstream on secondary paths. Non-repair nodes (i.e., nodes that cannot restore flow for a particular stream) do not generate initial mapping messages or modify mapping messages they receive for that stream. Rather, non-repair nodes may simply forward those label mapping messages upstream on a primary or secondary path.

Figure 2:
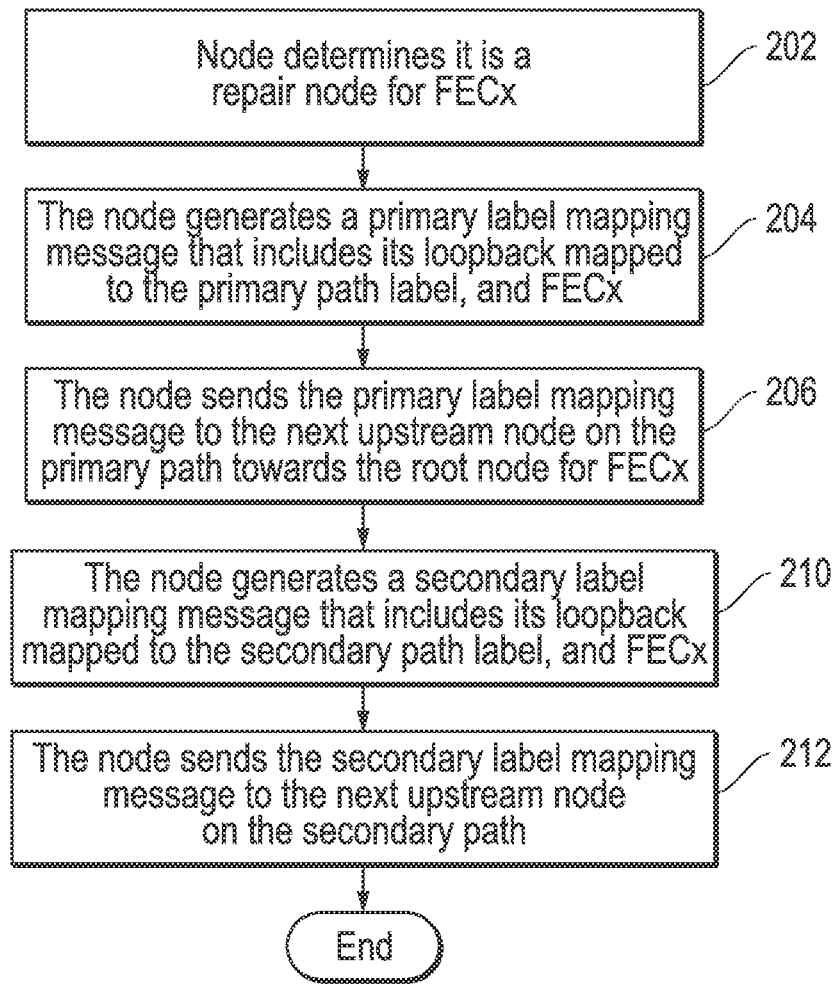
FIG. 2 is a flowchart illustrating an example process implemented by a repair node of the network shown in FIG. 1.
Figure 3:
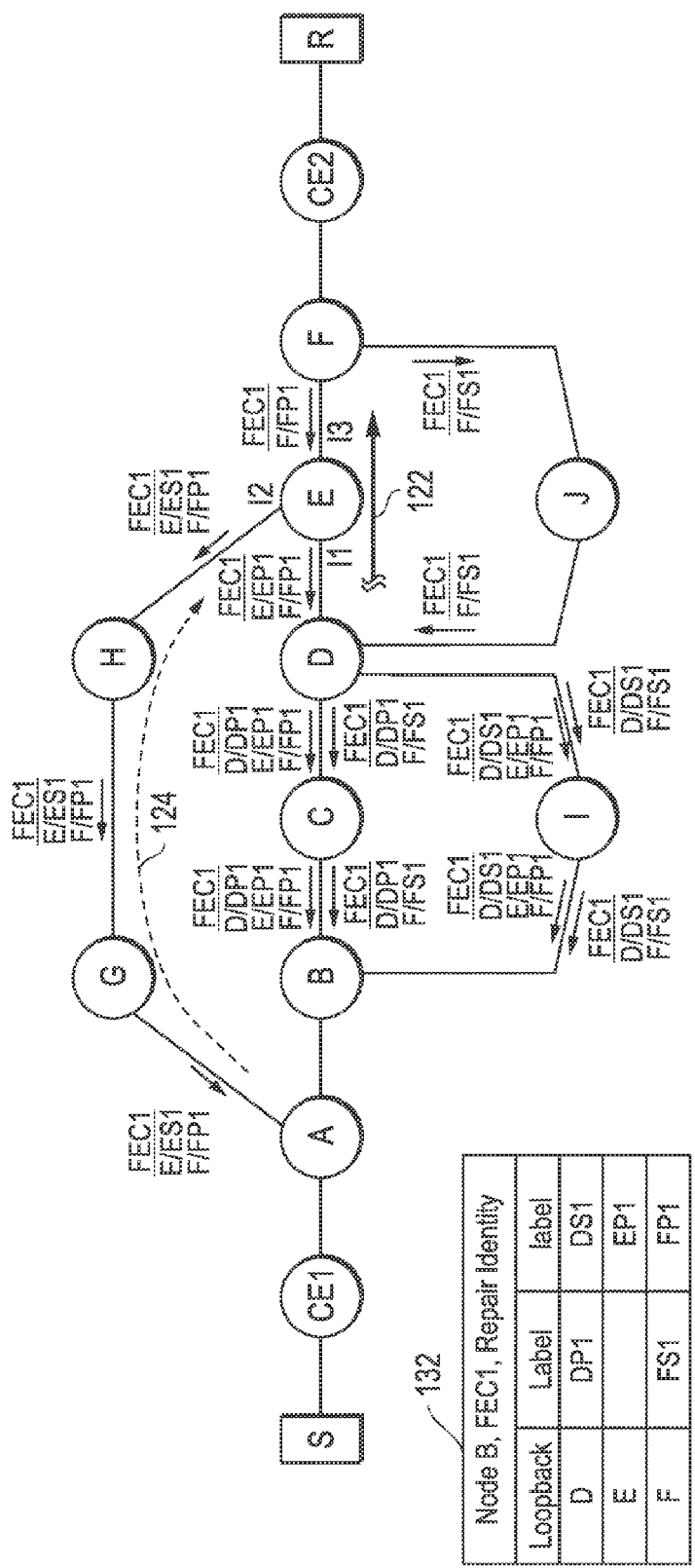
FIG. 3 shows relevant components of label mapping messages sent by a repair of the network shown in FIG. 1.

FIG. 2 illustrates relevant aspects of a process implemented by a repair node, such as repair node F shown within FIG. 1, to generate initial label mapping messages that are associated with a stream, such as the example stream identified by FEC1. FIG. 3 illustrates example label mapping messages sent by nodes of network 100, including initial mapping messages generated by node F for FEC1. It is noted that only relevant portions of the example label mapping messages are shown in FIG. 3.

With continuing reference to FIG. 2, the process begins after a node determines it is a repair node for the stream identified by FECx. Although not shown in FIG. 2, when the repair node joins the primary and secondary paths for FECx, the node updates its forwarding table and creates a pair of entries therein for FECx. One entry maps an incoming label (hereinafter the primary path label) attached to data packets received via the primary path to an outgoing label, and the other entry maps another incoming label (hereinafter the secondary path label) attached to redundant data packets received via the secondary path. Both entries map their incoming labels to the same outgoing label and next hop egress interface. Additionally, in one embodiment, each entry may contain a forwarding preference bit. Only one of the forwarding preference bits for the two FECx entries in the forwarding table will be set at any given time. For purposes of explanation, the preference bit in the entry corresponding to the primary path is presumed to be initially set, thus indicating that packets received via the primary path are to be forwarded, while the preference bit in the entry corresponding to the secondary path is not set, thus indicating that redundant packets received via the secondary path are dropped. FIG. 3 illustrates an example forwarding table for node E. As an aside, if the node's forwarding table contains two entries for FECx, the node understands it is a repair node for the stream identified by FECx.

With continuing reference to FIG. 2, when the node determines it is a repair node for FECx in step 202, the node generates a primary label mapping message that includes FECx, and the node's loopback mapped to the primary path label for FECx as shown in step 204. In step 206, the node sends the primary label mapping message to the next upstream node on the primary path. The node may look to the ingress interface mapped to the primary label in the forwarding table to determine the interface through which it sends the primary label mapping message. Similar steps are performed for a secondary label mapping message. In step 210, the node generates a secondary label mapping message that includes FECx, and the node's loopback mapped to the secondary path label for FECx. In step 212, the node sends the secondary label mapping message to the next upstream node on the secondary path. The labels can be generated in accordance with LDP or a modification thereof.

FIG. 3 shows example label mapping messages generated by node F in accordance with the process shown in FIG. 2. When node F learns that it is a repair node for the stream identified by FEC1, node F generates a primary label mapping message that includes FEC1, and its loopback F mapped to a primary path label FP1. Node F, in accordance with step 206, sends the primary label mapping message to Node E, the next upstream node on the primary path toward the provider root node for FEC1. In step 210, node F generates a secondary label mapping message that includes FEC, and its loopback F mapped to the secondary path label FS1. In step 212, node F sends the secondary label mapping messages it generates to node H, the next upstream node on the secondary path.

Nodes on primary and secondary paths for a stream can receive label mapping messages. A node may process a received label mapping message in different ways depending on (1) whether it is repair node or non-repair node, and (2) whether it is on the primary or the secondary path. Non-repair nodes on primary and secondary paths for a stream can forward mapping messages to upstream nodes on the primary and secondary paths with little or no modification. Repair and non-repair nodes on a primary path for a stream can learn the identity (e.g., loopbacks) of downstream repair nodes from label mapping messages they receive, and repair nodes on a primary path for a stream can replicate and forward label mapping messages to upstream nodes on the primary and secondary paths after modifying the message and its replication. These aspects are more fully described with reference to the example process implemented shown in FIG. 4, which is implemented by a node within the example network 100 in response to receiving a label mapping message that contains FECx.

Figure 4:
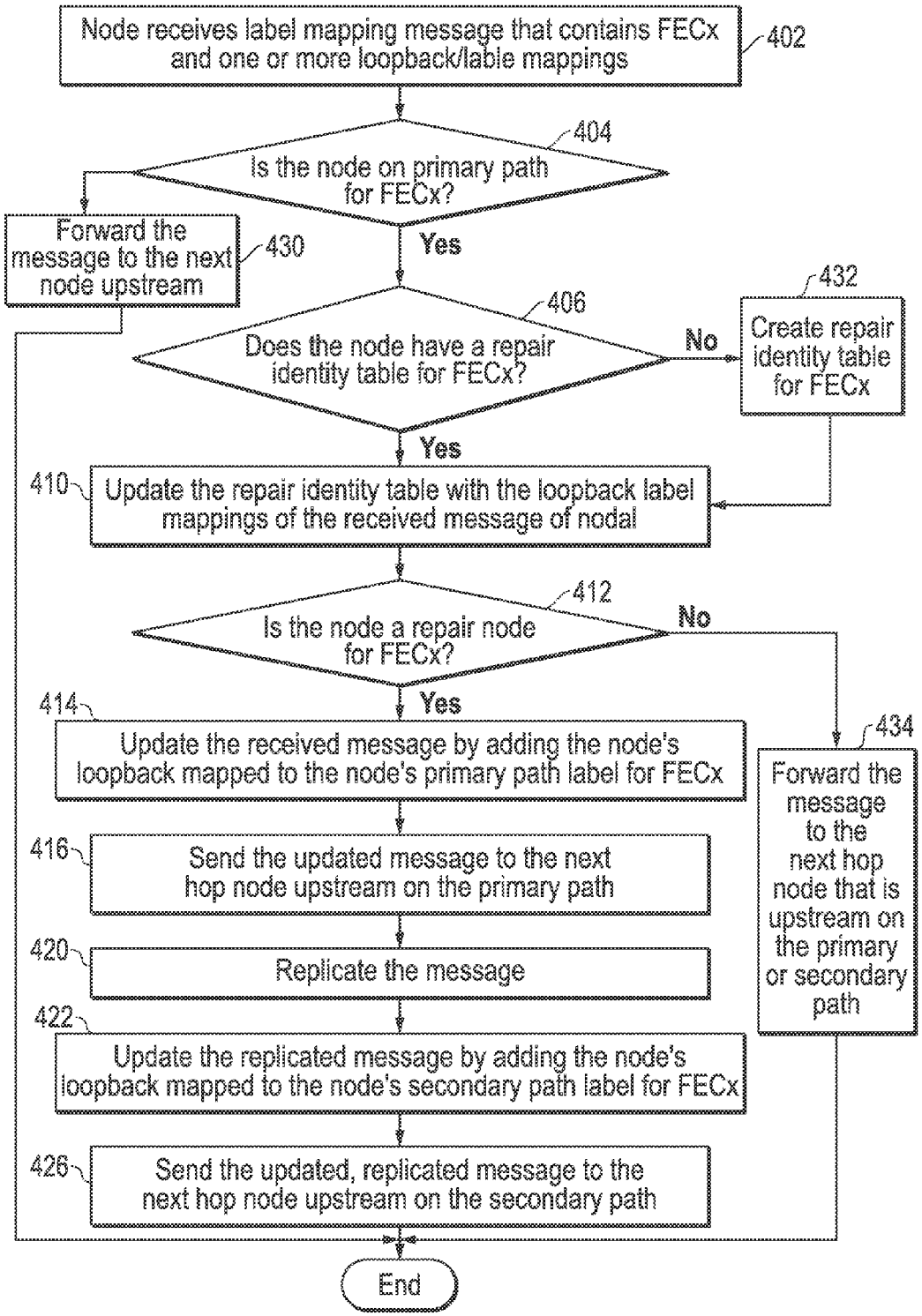
FIG. 4 is a flowchart illustrating an example process implemented by a node of the network shown in FIG. 1.

With continuing reference to FIGS. 3 and 4, upon receipt of the label mapping message in step 402, the node determines whether it is located on the primary path for FECx. If the node is on the primary path, the node determines if it contains a repair identity table for FECx. A repair identity table contains one or more entries for a data stream identified by a FEC. Each entry should include a loopback for a downstream repair node and one or more path identifiers (i.e., the primary path label and/or secondary path label). FIG. 3 illustrates an example repair identity table 132 that is stored in memory of node B. Repair identity table entries can be arranged in terms of nearness. In one embodiment, the topologically closest repair node (e.g., node D in table 132) can be identified in the first entry. The second topologically closest repair node, (i.e., node E in table 132) can be identified in the second entry of the repair identity table, and so on. The order of entries in a repair identity table can be rearranged as the node receives new label mapping messages. If the node lacks a repair identity table for FECx, the node creates a new table in memory as shown in step 432.

The node that receives the label mapping message should update its new or existing repair identity table for FECx to include the one or more label/loopback mappings contained in the received message if the repair identity table lacks the label/loopback mappings. This may include adding a new entry if the received label mapping message contains a loopback not previously contained in the repair identity table. Example repair identity table 132 is shown updated after node B receives the label mapping messages from nodes C and I. As will be more fully described below, a repair identity table can be used to select the appropriate repair node to restore the flow of a disrupted stream.

In step 412 the node determines whether it is a repair node for FECx. If it is, the node should announce itself as such to upstream nodes on the primary and secondary paths corresponding to FECx. The node maps its loopback to the primary path label it generated for the primary path associated with FECx. In step 414 the node then updates the label mapping message it received by concatenating the loopback/primary-label mapping it generated to the one or more loopback/label mappings of the received label mapping message. Thereafter the updated label mapping message is sent to the next upstream node on the primary path. It is noted that the next upstream node on the primary path should use the primary path label when forwarding data packets downstream on the primary path for the stream identified by FECx. The repair node performs similar steps with respect to the secondary path. The node maps its loopback to the secondary path label it generated for the secondary path. The node replicates the label mapping message it received in step 420. The node then updates the replicated label mapping message it received by concatenating its loopback/secondary-label mapping to the one or more loopback/label mappings of the replicated label mapping message. Thereafter the updated, replicated label mapping message is sent to the next upstream node on the secondary path as shown in step 426. It is noted that the next upstream node on the secondary path should use the secondary path label when forwarding redundant packets downstream on the secondary path for FECx.

If the node that receives the label mapping message of step 402 is not on the primary path for stream FECx or is not a repair node for stream FECx, the node instead forwards the label mapping message upstream to the next node on the primary or secondary path without modification as shown in step 430 or 434.

To illustrate the process shown in FIG. 4, node E receives the primary label mapping message described above from node F, which includes FEC1 and the F/FP1 mapping. When node E receives this label mapping message, it determines that it is a repair node on the primary path for FEC1 since its forwarding table contains FEC1 entries mapped to separate ingress interfaces and/or separate incoming labels. In accordance with step 410, node E may update its repair identity table (not shown) using the label mappings of the received message. Node E also replicates the primary label mapping message from node F, and modifies the replicated message to include the loopback/label mapping E/ES1 where ES1 is the secondary path label for the secondary path 124. Node E sends the modified, replicated label mapping message to node H, the next upstream node on the secondary path 124. Node E also forwards the label mapping message after it is updated to include the loopback/label mapping E/EP1 where EP1 is the primary path label generated by node E. The updated received label mapping message is forwarded to node C, the next upstream node on the primary path 122 for FEC1.

Detection of a Local Failure and Restoration of Stream Flow

A node can detect a local failure that interrupts the flow of one or more primary path streams to receivers. The node can use repair identity tables for respective disrupted streams to identify the proper downstream repair nodes for restoring streams. The node can send FNPs to repair nodes via unicast transmission. In this manner, intervening repair nodes need not inspect the FNP.

Figure 5:
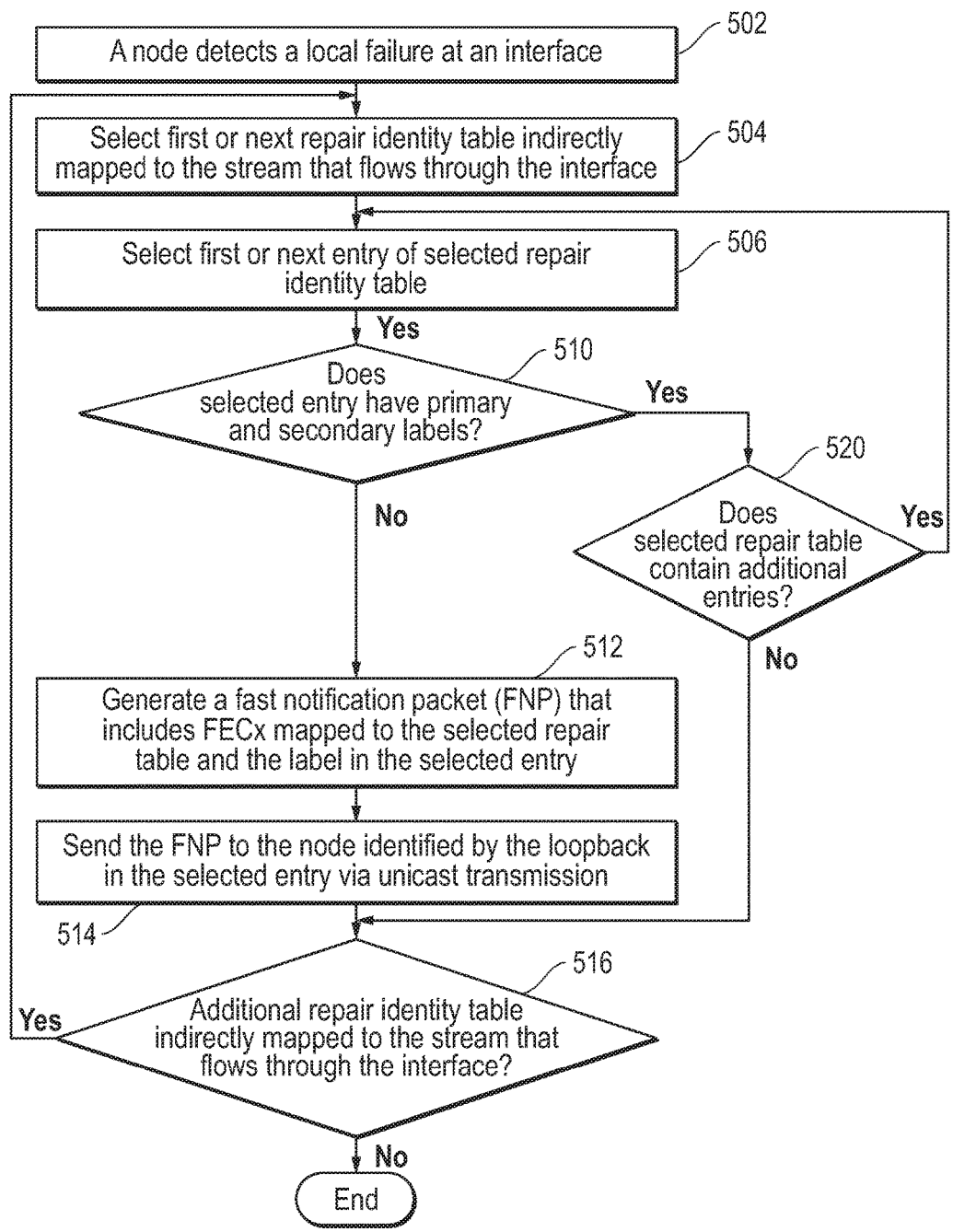
FIG. 5 is a flowchart illustrating an example process implemented by a node that detects a local failure.

FIG. 5 illustrates a process for identifying proper repair nodes and subsequently generating FNPs to restore flow. When the node detects a local failure at an ingress interface, the node can identify streams that are interrupted by the failure. In one embodiment, the node can access its forwarding table to identify the FECs of interrupted streams; the FECs of the interrupted streams are those in the forwarding table that are mapped to the interface where the local failure was detected.

The node selects the first or next FEC of the interrupted streams, which in turn is used to select the corresponding first or next repair identity table as shown in 504. At step 506, a first or next entry of the repair identity table is selected. At step 510, the node determines whether the selected entry includes two different labels. If it does, the repair node identified in the selected entry should not be used to restore flow of the stream to downstream receivers. When an entry is found that includes only one label, the process proceeds to step 512 where the node generates an FNP that includes the FEC for the selected repair identity table and/or the one label in the selected entry thereof. For purposes of explanation only, the FNP is assumed to include both the FEC of the selected repair identity table and the single label in the selected entry thereof. The FNP is transmitted to the repair node identified by the loopback in the selected entry via a unicast transmission as shown in step 514. To this end, the FNP can select a label associated with a P2P LSP that can be used for unicast transmission to the repair node identified in the selected entry. The selected label is attached to the FNP, and the combination is forwarded to the next hop of the P2P LSP towards the repair node. The process shown in FIG. 5 should be implemented with each repair identity table indirectly mapped to the ingress interface of the local failure.

To illustrate the process shown in FIG. 5, presume node B detects a failure at the interface connected to node A. Using the identity of the interface, node B accesses its forwarding table and identifies at least FEC1 as the identity of a stream disrupted by the failure. Node B then accesses repair identity table 132, and identifies node E as the repair node that can restore flow of the interrupted stream since the entry for node E contains only one label. Accordingly, node B generates an FNP for unicast transmission to node E, which includes FEC1, the identity of the interrupted stream, and/or EP1, the label contained within the entry identified in step 510. For purposes of explanation only, node B generates an FNP that includes both FEC1 and label EP1. Node B sends the FNP after node B attaches the label needed to forward the FNP along a P2P LSP to node E. Node E can use FEC1 and EP1 contained in the FNP to switch over to forwarding redundant packets received on secondary path 124, assuming node E has not already made the switch.

Figure 6:
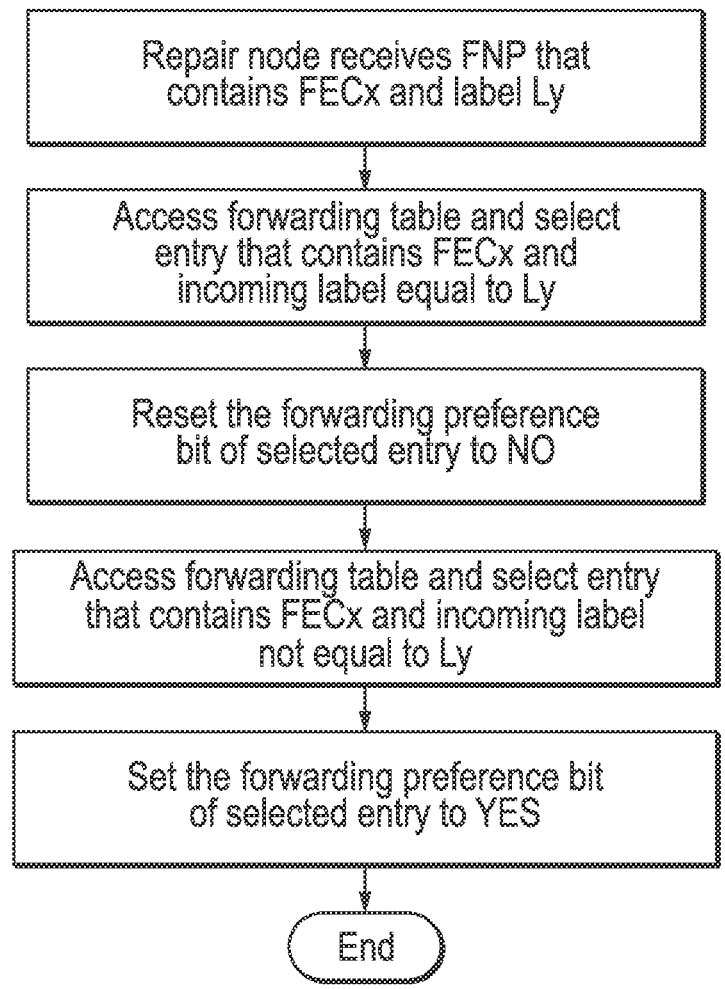
FIG. 6 is a flowchart illustrating an example process implemented by a node for restoring the flow of a data stream.

A repair node can restore an interrupted stream by forwarding redundant packets it receives via a secondary path. FIG. 6 illustrates an example process implemented by a repair node in response to receiving an FNP that was generated by the process shown in FIG. 5. In the embodiment shown, the repair node accesses its forwarding table and selects an entry that contains (1) the FEC identified in the FNP, and (2) the label that is not contained in the FNP. In step 606, the repair node sets the forwarding preference bit of the selected entry unless it has already been set to "yes." The repair node begins forwarding redundant packets received on the secondary path. In other words, once the forwarding preference bit is set the repair node will accept and forward packets with an incoming label identified by the selected entry that are received at the ingress interface identified in the selected entry. In the illustrated example, node E will receive the example FNP from node B, which includes FEC1 and label EP1. Node E accesses forwarding table 134 and selects the entry containing FEC1 and ES1. Node E sets the forwarding preference bit in the entry so that node E begins accepting and forwarding redundant packets from secondary path, which in turn restores the flow of the example stream to node F.

Zero Packet Loss

In addition to the foregoing, a repair node may contain respective pairs of packet identity memories and redundant first in/first out (FIFO) buffers, one pair for each primary/secondary path combination. A packet identity memory stores the identity of the most recent packet of a stream that was received on a primary path and forwarded downstream to receivers. In one embodiment, the packet identity should be unique to the packet. For the purposes of explanation only, the packet identity will take form in the checksum contained in the packet. As a new packet of the stream forwarded downstream to receivers, the repair node overwrites the checksum in the corresponding packet identity memory with the checksum of the new packet. When the stream is interrupted by an upstream failure, the corresponding packet identity memory will store the checksum of the last packet forwarded to the receivers before the interruption.

The FIFO buffers temporarily store redundant packets received on respective secondary paths. The FIFO buffers store the redundant packet until they are dropped or forwarded to the receivers. Redundant packets are stored in a corresponding FIFO in the order in which they are received by the repair node. The oldest redundant packet stored in the FIFO is forwarded or dropped when a new redundant copy is received and stored in the FIFO. Assuming no upstream failure that disrupts the flow of the stream on the corresponding primary path, the oldest redundant packet in the FIFO is dropped. However, if an upstream failure occurs that disrupts the flow of the stream on the corresponding primary path, the repair node switches to forwarding redundant packets from the FIFO buffer after receiving an FNP. The repair node can use the checksum stored in the corresponding packet identity memory to determine the boundary in the FIFO buffer between redundant packets that should not be forwarded to receivers and redundant packets that should be forwarded to receivers. More particularly, the repair node compares the checksum stored in the packet identity memory to checksums of redundant packets stored in the FIFO until a match is found. The repair node forwards redundant packets in the FIFO that were received after the redundant packet with the matching checksum. The repair node drops the redundant packet in the FIFO with the matching checksum and all redundant packets that were received prior to the redundant packet with the matching checksum. In this manner, the receivers of the stream should receive all packets notwithstanding a local failure on the primary path. In other words, no packets are lost due to the local failure in the primary path.

Example Node

Figure 7:
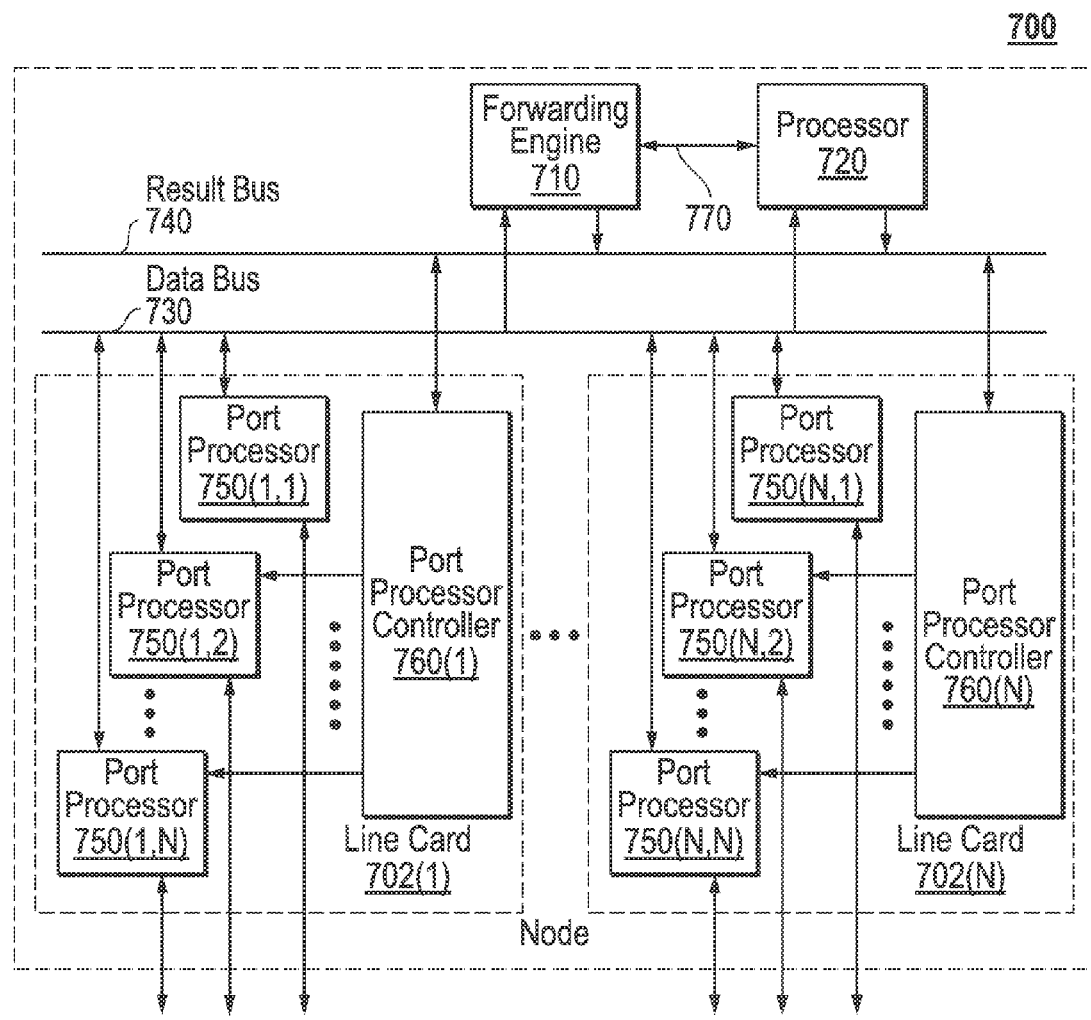
FIG. 7 is a block diagram illustrating certain components of an example node that can be employed in the network of FIG. 1 or 3

FIG. 7 is a block diagram illustrating certain additional and/or alternative components of nodes that can be employed in the networks shown in FIGS. 1, 2A, and 4. In this depiction, node 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet or packet is received, the packet may be identified and analyzed by router 700 in the following manner. Upon receipt, a packet (or some or all of its control information or a label attached to the packet) is sent from the one of port processors 750(1,1)-(N,N) at which the packet is received to one or more of those devices coupled to data bus 730 (e.g., others of port processors 650(1,1)-(N,N), forwarding engine 710 and/or processor 720). Handling of the packet can be determined, for example, by forwarding engine 710. For example, forwarding engine 710 may determine that the packet should be forwarded to one or more of port processors 750(1,1)-(N,N). This can be accomplished by indicating to corresponding one(s) of port processor controllers 760(1)-(N) that the packet held in the given one(s) of port processors 750(1,1)-(N,N) should be forwarded to the appropriate one of port processors 750(1,1)-(N,N). In addition, or alternatively, once a packet has been identified for processing, forwarding engine 710, processor 720 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   a first repair node generating a first message and a second message, wherein
      each of the first and second messages comprises a first node identification (ID) that uniquely identifies the first repair node within a network domain,
      the first message comprises a first path ID, wherein
      the first path ID corresponds to a first path through which the first repair node receives data packets of a stream,
      the second message comprises a second path ID, wherein
      the second path ID corresponds to a second path through which the first repair node receives copies of the data packets, and
      the first and second path IDs are distinct from each other;
   the first repair node transmitting the first message upstream towards a root node for the stream via a first interface of the first repair node; and
   the first repair node transmitting the second message upstream towards the root node via a second interface of the first repair node, wherein
      the first and second interfaces are distinct from each other.

2. The method of claim 1, wherein
   the first path ID comprises a first label distribution protocol (LDP) label generated by the first repair node,
   the second path ID comprises a second LDP label generated by the first repair node, and
   the first and second LDP labels are distinct from each other.

3. The method of claim 2 further comprising:
   the first repair node receiving the data packets of the stream via the first interface, wherein
      the first LDP label is attached to each of the data packets of the stream that are received via the first interface; and
   the first repair node receiving the data packet copies via the second interface, wherein
      the second LDP label is attached to each of the data packet copies that are received via the second interface.

4. The method of claim 3 further comprising:
   the first repair node forwarding the data packets of the stream, but not forwarding the data packet copies, downstream to a neighbor node via a third interface of the first repair node.

5. The method of claim 4 further comprising:
   the first repair node receiving a notification packet directly or indirectly from an upstream node that is upstream towards the root node, wherein
      the first repair node receives the notification packet in response to an interruption of the receipt of the data packets of the stream; and
   the first repair node forwarding the data packet copies to the neighbor node via the third interface in response to the first repair node receiving the notification packet.

6. The method of claim 5 further comprising:
   the upstream node receiving and storing the first LDP label and the first node ID in memory;
   the upstream node receiving the data packets from a fourth node via a communication link, wherein
      the fourth node is a neighbor node that is upstream towards the root node;
   the upstream node detecting a failure of the fourth node or the communication link after receiving the data packets;
   the upstream node transmitting the notification packet directly or indirectly to the first repair node in response to the detection of the failure of the fourth node or the communication link; and
   wherein the notification packet comprises the first LDP label and an instruction.

7. The method of claim 6 further comprising:
   the upstream node transmitting the notification packet directly or indirectly to the first repair node via a point-to-point (P2P) label switched path (LSP) between the upstream node and the first repair node.

8. The method of claim 1, wherein
   each of the first and second messages comprises an ID of the stream.

9. The method of claim 8, wherein
   the ID of the stream comprises a forwarding equivalence class (FEC) value.

10. The method of claim 1 further comprising:
   a second node generating second-node messages in response to directly or indirectly receiving the first message, wherein each of the second-node messages comprises the first node ID and a second node ID that uniquely identifies the second node;
the second node transmitting one of the second-node messages upstream towards the root node via one interface of the second node;
the second node transmitting another of the second-node messages upstream towards the root node via another interface of the second node, wherein the one interface and the other interface are distinct from each other.

11. The method of claim 1 further comprising a second node forwarding the second message towards the root node.

12. A network repair node comprising:
a means for generating a first message and a second message, wherein
each of the first and second messages comprises a first node identification (ID) that uniquely identifies the network repair node within a network domain,
the first message comprises a first path ID, wherein
the first path ID corresponds to a first path through which the network repair node receives data packets of a stream,
the second message comprises a second path ID, wherein
the second path ID corresponds to a second path through which the network repair node receives copies of the data packets, and
the first and second path IDs are distinct from each other;
a means for transmitting the first message upstream towards a root node for the stream via a first interface of the network repair node; and
a means for transmitting the second message upstream towards the root node via a second interface of the network repair node, wherein
the first and second interfaces are distinct from each other.

13. The network repair node of claim 12, wherein
the first path ID comprises a first label distribution protocol (LDP) label generated by the network repair node,
the second path ID comprises a second LDP label generated by the network repair node, and
the first and second LDP labels are distinct from each other.

14. The network repair node of claim 13 further comprising:
a means for receiving the data packets of the stream via the first interface, wherein
the first LDP label is attached to each of the data packets of the stream that are received via the first interface; and
a means for receiving the data packet copies via the second interface, wherein
the second LDP label is attached to each of the data packet copies that are received via the second interface.

15. The network repair node of claim 14 further comprising:
a means for forwarding the data packets of the stream, but not forwarding the data packet copies, downstream to a neighbor node via a third interface of the network repair node.

16. The network repair node of claim 15 further comprising:
a means for receiving a notification packet directly or indirectly from a node that is upstream towards the root node, wherein
the notification packet is received in response to an interruption of the receipt of the data packets of the stream; and
a means for forwarding the data packet copies to the neighbor node via the third interface in response to the receiving the notification packet.

17. A non-transitory computer readable storage medium (CRSM) comprising executable instructions, wherein a first repair node in a network domain implements a method in response to executing the instructions, the method comprising:
generating a first message and a second message, wherein
each of the first and second messages comprises a first node identification (ID) that uniquely identifies the first repair node within a network domain,
the first message comprises a first path ID, wherein
the first path ID corresponds to a first path through which the first repair node receives data packets of a stream,
the second message comprises a second path ID, wherein
the second path ID corresponds to a second path through which the first repair node receives copies of the data packets, and
the first and second path IDs are distinct from each other;
transmitting the first message upstream towards a root node for the stream via a first interface of the first repair node; and
transmitting the second message upstream towards the root node via a second interface of the first repair node, wherein
the first and second interfaces are distinct from each other.

18. The CRSM of claim 17, wherein
the first path ID comprises a first label distribution protocol (LDP) label generated by the first repair node,
the second path ID comprises a second LDP label generated by the first repair node, and
the first and second LDP labels are distinct from each other.

19. The CRSM of claim 18 further comprising:
receiving the data packets of the stream via the first interface, wherein
the first LDP label is attached to each of the data packets of the stream that are received via the first interface; and
receiving the data packet copies via the second interface, wherein
the second LDP label is attached to each of the data packet copies that are received via the second interface.

20. The CRSM of claim 19 further comprising:
forwarding the data packets of the stream, but not forwarding the data packet copies, downstream to a neighbor node via a third interface of the first repair node.

* * * * *